US012590653B2

(12) United States Patent
Taira et al.

(10) Patent No.: US 12,590,653 B2
(45) Date of Patent: Mar. 31, 2026

(54) FUEL HOSE

(71) Applicant: Sumitomo Riko Company Limited, Aichi (JP)

(72) Inventors: Mayuka Taira, Aichi (JP); Takaki Nakashima, Aichi (JP); Ryo Hirai, Aichi (JP)

(73) Assignee: Sumitomo Riko Company Limited, Aichi (JP)

( * ) Notice: Subject to any disclaimer, the term of this patent is extended or adjusted under 35 U.S.C. 154(b) by 342 days.

(21) Appl. No.: 18/528,797

(22) Filed: Dec. 5, 2023

(65) Prior Publication Data

US 2024/0110647 A1      Apr. 4, 2024

Related U.S. Application Data

(63) Continuation of application No. PCT/JP2022/015455, filed on Mar. 29, 2022.

(51) Int. Cl.
| | |
|---|---|
| *F16L 11/04* | (2006.01) |
| *B32B 25/04* | (2006.01) |
| *C08K 3/04* | (2006.01) |
| *C08K 3/22* | (2006.01) |
| *C08K 3/26* | (2006.01) |
| *C08K 5/103* | (2006.01) |

(Continued)

(52) U.S. Cl.
CPC ............ *F16L 11/04* (2013.01); *B32B 25/042* (2013.01); *C08K 3/04* (2013.01); *C08K 3/22* (2013.01); *C08K 3/26* (2013.01); *C08K 5/103* (2013.01); *C08K 5/14* (2013.01); *C08K 5/34924* (2013.01); *B32B 2597/00* (2013.01); *C08K 2003/2206* (2013.01); *C08K 2003/267* (2013.01)

(58) Field of Classification Search
CPC .... F16L 11/04; B32B 25/042; B32B 2597/00; B32B 1/08; B32B 25/14; C08K 3/04; C08K 3/22; C08K 3/26; C08K 5/103; C08K 5/14; C08K 5/34924; C08K 2003/2206; C08K 2003/267
See application file for complete search history.

(56) References Cited

U.S. PATENT DOCUMENTS

2020/0109263 A1      4/2020   Matsui

FOREIGN PATENT DOCUMENTS

| | | |
|---|---|---|
| JP | H07239063 | 9/1995 |
| JP | H11304058 | 11/1999 |

(Continued)

OTHER PUBLICATIONS

English machine translation for JP2004131543 (Year: 2004).*

*Primary Examiner* — Michael C Miggins
(74) *Attorney, Agent, or Firm* — JCIPRNET

(57) ABSTRACT

A fuel hose has an inner layer in a tubular shape and an outer layer provided in contact with an outer circumferential surface of the inner layer, and the inner layer is composed of a crosslinked body of a rubber composition containing the following (A) to (E), and the outer layer is composed of a crosslinked body of a rubber composition containing the following (F) to (G):
(A) polyol-crosslinked fluororubber
(B) polyol crosslinking agent
(C) calcium hydroxide
(D) triallyl isocyanurate
(E) peroxide crosslinking agent
(F) hydrin rubber
(G) monoglyceride having an aliphatic hydrocarbon group having 10 or more and 22 or less carbon atoms.

7 Claims, 1 Drawing Sheet

12

14

10

(51) Int. Cl.
      C08K 5/14           (2006.01)
      C08K 5/3492     (2006.01)

(56)                  References Cited

FOREIGN PATENT DOCUMENTS

| | | |
|---|---|---|
| JP | 2007185826 | 7/2007 |
| JP | 2008265273 | 11/2008 |
| JP | 2011173376 | 9/2011 |
| WO | 2007111334 | 10/2007 |
| WO | 2018225478 | 12/2018 |

* cited by examiner

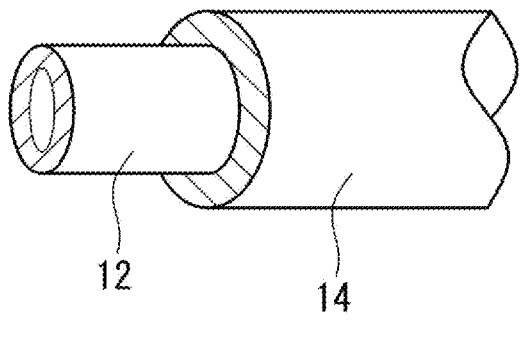
12                    14
10

FUEL HOSE

CROSS-REFERENCE TO RELATED APPLICATION

The present application is a continuation of PCT/JP2022/015455, filed on Mar. 29, 2022. The entire contents of the aforementioned application are hereby incorporated by reference herein.

TECHNICAL FIELD

The disclosure relates to a fuel hose, and more specifically, to a fuel hose used for transporting a fuel for automobiles and the like.

RELATED ART

For a fuel hose used for transporting a fuel for automobiles and the like, various hoses formed by laminating and integrating a plurality of layers are used. Among these, a laminated hose having an inner layer composed of a fluororubber with excellent low fuel permeability (barrier property) and an outer layer composed of a hydrin rubber has been proposed.

RELATED ART LITERATURE

Patent Literature

[Patent Literature 1] Japanese Patent Application Laid-Open No. 2007-185826
[Patent Literature 2] Japanese Patent Application Laid-Open No. 2008-265273

Polyol-crosslinked fluororubbers tend to scorch (fade) when calcium hydroxide is used as a crosslinking accelerator. After an inner layer composed of a polyol-crosslinked fluororubber and an outer layer composed of a hydrin rubber are extruded, when the laminate is stored in a raw rubber state, the inner layer scorches (fades) at the adhesive interface between the inner layer and the outer layer, and as a result, it has been found that the reaction between the polyol-crosslinked fluororubber and the hydrin rubber is inhibited during crosslinking, and there is a problem of the adhesion between the inner layer and the outer layer decreasing.

Thus, it is desired to provide a fuel hose having excellent adhesion between an inner layer composed of a polyol-crosslinked fluororubber and an outer layer composed of a hydrin rubber even when stored in a raw rubber state after extrusion.

SUMMARY

The fuel hose according to an embodiment of the disclosure is a fuel hose having an inner layer in a tubular shape and an outer layer provided in contact with an outer circumferential surface of the inner layer, the inner layer is composed of a crosslinked body of a rubber composition containing the following (A) to (E), and the outer layer is composed of a crosslinked body of a rubber composition containing the following (F) to (G):
  (A) polyol-crosslinked fluororubber
  (B) polyol crosslinking agent
  (C) calcium hydroxide
  (D) triallyl isocyanurate
  (E) peroxide crosslinking agent (F) hydrin rubber
  (G) monoglyceride having an aliphatic hydrocarbon group having 10 or more and 22 or less carbon atoms.

In an embodiment, the content of (G) with respect to 100 parts by mass of (F) may be 0.5 parts by mass or more and 5.0 parts by mass or less. In an embodiment, the outer layer may further contain carbon black having a DBP absorption amount of 50 $cm^3/100$ g or more and 120 $cm^3/100$ g or less. In an embodiment, the outer layer may further contain an acid acceptor. In an embodiment, the acid acceptor may be a hydrotalcite. In an embodiment, the outer layer may further contain a plasticizer. In an embodiment, the plasticizer may have a solubility parameter value of 8.0 or more and 10.0 or less.

In the fuel hose according to an embodiment of the disclosure, the inner layer in a tubular shape is composed of a crosslinked body of a rubber composition containing the above (A) to (E), and the outer layer provided in contact with an outer circumferential surface of the inner layer is composed of a crosslinked body of a rubber composition containing the above (F) to (G). The monoglyceride added to the outer layer containing a hydrin rubber is likely to be unevenly distributed at the interface with the inner layer in the outer layer containing a hydrin rubber, and appears at the adhesive interface between the inner layer and the outer layer. The monoglyceride reduces scorching (fading) of the polyol-crosslinked fluororubber due to calcium hydroxide at the adhesive interface between the inner layer and the outer layer, and the adhesion between the inner layer composed of a polyol-crosslinked fluororubber and the outer layer composed of a hydrin rubber is excellent even when stored in a raw rubber state after extrusion.

Here, when the (G) content with respect to 100 parts by mass of (F) is 0.5 parts by mass or more and 5.0 parts by mass or less, an effect of reducing scorching (fading) of the polyol-crosslinked fluororubber at the adhesive interface between the inner layer and the outer layer is excellent.

Here, when the outer layer further contains carbon black having a DBP absorption amount of 50 $cm^3/100$ g or more and 120 $cm^3/100$ g or less, carbon black makes it difficult for the monoglyceride to be adsorbed, and the monoglyceride is likely to exhibit an effect of reducing scorching (fading) of the polyol-crosslinked fluororubber at the adhesive interface between the inner layer and the outer layer.

Here, when the outer layer further contains an acid acceptor, an acid generated by decomposition of monoglycerides can be neutralized and the crosslinking reaction is not inhibited, and thus the adhesive strength between the inner layer and the outer layer is improved. When the acid acceptor is a hydrotalcite, the effect is particularly excellent.

Here, when the outer layer further contains a plasticizer and the plasticizer has a solubility parameter value of 8.0 or more and 10.0 or less, since the solubility parameter value is close to that of the hydrin rubber, the monoglyceride can appear at the interface with the inner layer in the outer layer containing a hydrin rubber without being inhibited by the plasticizer.

BRIEF DESCRIPTION OF DRAWING

FIGURE is a configuration diagram showing a fuel hose according to one embodiment of the disclosure.

DESCRIPTION OF EMBODIMENTS

A fuel hose according to the disclosure will be described in detail.

FIGURE shows a fuel hose according to one embodiment of the disclosure. As shown in FIGURE, a fuel hose 10 has an inner layer 12 in a tubular shape and an outer layer 14 provided in contact with an outer circumferential surface of the inner layer 12.

The inner layer 12 is composed of a crosslinked body of a rubber composition containing the following (A) to (E):

(A) polyol-crosslinked fluororubber (B) polyol crosslinking agent (C) calcium hydroxide (D) triallyl isocyanurate (E) peroxide crosslinking agent.

The polyol-crosslinked fluororubber is a fluororubber having a polyol crosslinkable moiety. Examples of polyol crosslinkable moieties include a moiety having a vinylidene fluoride unit. Examples of fluororubbers having a vinylidene fluoride unit include copolymers of vinylidene fluoride and hexafluoropropylene, terpolymers of vinylidene fluoride, hexafluoropropylene and tetrafluoroethylene, copolymers of vinylidene fluoride and ethylene trifluoride chloride, terpolymers of vinylidene fluoride, perfluoromethyl ether and tetrafluoroethylene, and terpolymers of vinylidene fluoride, tetrafluoroethylene and propylene. Among these, terpolymers of vinylidene fluoride, hexafluoropropylene and tetrafluoroethylene are particularly preferable. Here, polyol-crosslinked fluororubber may have a peroxide crosslinkable moiety, and in this case, a peroxide crosslinking agent may be used.

Examples of polyol crosslinking agents include polyhydroxy compounds. Examples of polyhydroxy compounds include 2,2-bis(4-hydroxyphenyl)propane, 2,2-bis(4-hydroxyphenyl)perfluoropropane, resorcinol, 1,3-dihydroxybenzene, 1,7-dihydroxynaphthalene, 2,7-dihydroxynaphthalene, 1,6-dihydroxynaphthalene, 4,4'-dihydroxydiphenyl, 4,4'-dihydroxystilbene, 2,6-dihydroxyanthracene, hydroquinone, catechol, 2,2-bis(4-hydroxyphenyl)butane, 4,4-bis(4-hydroxyphenyl)valeric acid, 2,2-bis(4-hydroxyphenyl)tetrafluorodichloropropane, 4,4'-dihydroxydiphenylsulfone, 4,4'-dihydroxydiphenylketone, tri(4-hydroxyphenyl)methane, 3,3',5,5'-tetrachlorobisphenol A, and 3,3',5,5'-tetrabromobisphenol A. Among these, a polyhydroxy aromatic compound is preferable, and 2,2-bis(4-hydroxyphenyl)propane is particularly preferable in order to obtain excellent heat resistance.

The amount of the polyol crosslinking agent added with respect to 100 parts by mass of the polyol-crosslinked fluororubber is preferably 0.2 parts by mass or more and 10 parts by mass or less. If the addition amount is 0.2 parts by mass or more, it is possible to increase the crosslinking density and it is possible to minimize the compression permanent set. In addition, if the addition amount is 10 parts by mass or less, the crosslinking density is prevented from becoming too high and cracking during compression is minimized. Therefore, the addition amount is more preferably 0.5 parts by mass or more and 7.0 parts by mass or less, and still more preferably 1.0 part by mass or more and 5.0 parts by mass or less.

Calcium hydroxide is used as a crosslinking accelerator for polyol-crosslinked fluororubber. The amount of calcium hydroxide added with respect to 100 parts by mass of the polyol-crosslinked fluororubber is preferably 1.0 part by mass or more and 10 parts by mass or less. The addition amount is more preferably 2.0 parts by mass or more and 8.0 parts by mass or less, and more preferably 3.0 parts by mass or more and 7.0 parts by mass or less.

Triallyl isocyanurate is used as a co-crosslinking agent. When triallyl isocyanurate is added, it is possible to improve the adhesive strength between the inner layer 12 and the outer layer 14. The amount of triallyl isocyanurate added with respect to 100 parts by mass of the polyol-crosslinked fluororubber is preferably 0.2 parts by mass or more and 10 parts by mass or less. The addition amount is more preferably 0.3 parts by mass or more and 5.0 parts by mass or less, and still more preferably 0.4 parts by mass or more and 3.0 parts by mass or less. The peroxide crosslinking agent can be used together with the co-crosslinking agent to improve the adhesive strength between the inner layer 12 and the outer layer 14. The amount of the peroxide crosslinking agent added with respect to 100 parts by mass of the polyol-crosslinked fluororubber is preferably 0.1 parts by mass or more and 5.0 parts by mass or less. The addition amount is more preferably 0.2 parts by mass or more and 3.0 parts by mass or less, and still more preferably 0.3 parts by mass or more and 2.0 parts by mass or less.

Examples of peroxide crosslinking agents include peroxyketals such as 1,1-bis(t-butylperoxy)-3,3,5-trimethylcyclohexane, 1,1-bis(t-hexylperoxy)-3,3,5-trimethylcyclohexane, 1,1-bis(t-hexylperoxy)cyclohexane, 1,1-bis(t-butylperoxy)cyclododecane, 1,1-bis(t-butylperoxy)cyclohexane, 2,2-bis(t-butylperoxy)octane, n-butyl-4,4-bis(t-butylperoxy)butane, and n-butyl-4,4-bis(t-butylperoxy)valerate, dialkyl peroxides such as di-t-butyl peroxide, dicumyl peroxide, t-butylcumyl peroxide, α,α'-bis(t-butylperoxy-m-isopropyl)benzene, α,α'-bis(t-butylperoxy)diisopropylbenzene, 2,5-dimethyl-2,5-di(t-butylperoxy)hexane, and 2,5-dimethyl-2,5-bis(t-butylperoxy)hexyne-3, diacyl peroxides such as acetyl peroxide, isobutyryl peroxide, octanoyl peroxide, decanoyl peroxide, lauroyl peroxide, 3,5,5-trimethylhexanoyl peroxide, benzoyl peroxide, 2,4-dichlorobenzoyl peroxide, and m-trioyl peroxide, peroxyesters such as t-butyl peroxyacetate, t-butyl peroxyisobutyrate, t-butylperoxy-2-ethylhexanoate, t-butylperoxylaurylate, t-butylperoxybenzoate, di-t-butylperoxyisophthalate, 2,5-dimethyl-2,5-di(benzoylperoxy)hexane, t-butyl peroxymaleic acid, t-butyl peroxyisopropyl carbonate, and cumyl peroxy octate, and hydroperoxides such as t-butyl hydroperoxide, cumene hydroperoxide, diisopropylbenzene hydroperoxide, 2,5-dimethylhexane-2,5-dihydroperoxide, and 1,1,3,3,-tetramethylbutyl peroxide. These may be used alone or two or more thereof may be used in combination.

The fluorine-based rubber composition that forms the inner layer 12 may contain, as necessary, additives that are added to the fluorine-based rubber composition. Examples of such additives include fillers, processing aids, plasticizers, colorants, stabilizers, adhesion aids, acid acceptors, mold release agents, thermal conductivity imparting agents, thermal conductivity imparting agents, surface non-adhesives, flexibility imparting agents, heat resistance improvers, and flame retardants. Examples of acid acceptors include magnesium oxide and hydrotalcite. Examples of fillers include carbon black.

The outer layer 14 is composed of a crosslinked body of a rubber composition containing the following (F) to (G):

(F) hydrin rubber (G) monoglyceride having an aliphatic hydrocarbon group having 10 or more and 22 or less carbon atoms.

Examples of hydrin rubbers include epichlorohydrin homopolymers (CO), epichlorohydrin-ethylene oxide copolymers (ECO), epichlorohydrin-propylene oxide copolymers, epichlorohydrin-ethylene oxide-allyl glycidyl ether terpolymers (GECO), epichlorohydrin-propylene oxide-allyl glycidyl ether terpolymers, and epichlorohydrin-ethylene oxide-propylene oxide-allyl glycidyl ether quaternary copolymers.

Examples of crosslinking agents for hydrin rubber include 2,3-dimercaptoquinoxaline derivatives. Specific examples thereof include quinoxaline-2,3-dithiocarbonate, 6-methylquinoxaline-2,3-dithiocarbonate, 6-isopropylquinoxaline-2,3-dithiocarbonate, and 5,8-dimethylquinoxaline-2,3-dithiocarbonate. Among these, 6-methylquinoxaline-2,3-dithiocarbonate is particularly preferable.

The amount of the crosslinking agent for the hydrin rubber added with respect to 100 parts by mass of the hydrin rubber is preferably 0.1 parts by mass or more and 5 parts by mass or less and more preferably 0.5 parts by mass or more and 4.0 parts by mass or less in order to allow crosslinking and reduce scorching.

The crosslinking agents may be used alone and may be used in combination with a strong base, an acid acceptor or the like. Examples of strong bases include 1,8-diazabicyclo(5,4,0)undecene-7 salt (DBU salt).

Examples of DBU salts include carboxylic acids such as naphthoic acid, 2-hydroxynaphthoic acid, sorbic acid, 2-ethylhexylic acid, gallic acid, p-hydroxybenzoic acid, and cinnamic acid, and DBU salts of phenolic resins. Among these, naphthoic acid and DBU salts of phenolic resins are particularly preferable.

The amount of the DBU salt added with respect to 100 parts by mass of the hydrin rubber is preferably 0.1 parts by mass or more and 5.0 parts by mass or less and more preferably 0.3 parts by mass or more and 3.0 parts by mass or less in order to allow crosslinking and reduce scorching.

The monoglyceride is a glycerin monoester obtained by reacting glycerin and fatty acids. The monoglyceride is used to reduce the occurrence of scorching (fading) of the polyol-crosslinked fluororubber due to calcium hydroxide at the adhesive interface between the inner layer 12 and the outer layer 14.

As the monoglyceride, one having an aliphatic hydrocarbon group having 10 or more and 22 or less carbon atoms is used. If the number of carbon atoms is less than 10, an effect of reducing scorching (fading) of the polyol-crosslinked fluororubber is insufficient. If the number of carbon atoms is more than 22, the molecular weight is large and uneven distribution at the interface between the outer layer 14 and the inner layer 12 becomes difficult, and an effect of reducing scorching (fading) of the polyol-crosslinked fluororubber is not exhibited at the adhesive interface between the inner layer 12 and the outer layer 14. The number of carbon atoms is more preferably 12 or more and 20 or less and more preferably 15 or more 18 or less in order to obtain an effect of reducing scorching (fading) of the polyol-crosslinked fluororubber. In addition, with diglycerides and triglycerides, rather than monoglycerides, the molecular weight is large and uneven distribution at the interface between the outer layer 14 and the inner layer 12 becomes difficult, and an effect of reducing scorching (fading) of the polyol-crosslinked fluororubber is not exhibited at the adhesive interface between the inner layer 12 and the outer layer 14. In addition, with fatty acid esters other than glycerides, an effect of reducing scorching (fading) of the polyol-crosslinked fluororubber is not exhibited.

The aliphatic hydrocarbon group of the monoglyceride may be linear or branched. A linear aliphatic hydrocarbon group of the monoglyceride is more preferable because uneven distribution is likely to occur at the interface between the outer layer 14 and the inner layer 12. In addition, the aliphatic hydrocarbon group of the monoglyceride may be a saturated hydrocarbon group or an unsaturated hydrocarbon group. For the aliphatic hydrocarbon group of the monoglyceride, the unsaturated hydrocarbon group is more preferable because it has excellent molecular mobility and uneven distribution is likely to occur at the interface between the outer layer 14 and the inner layer 12.

Examples of monoglycerides include glyceryl monolaurate (glyceryl laurate), glyceryl monomyristate (glyceryl myristate), glyceryl monopalmitate (glyceryl palmitate), glyceryl monooleate (glyceryl oleate), glyceryl stearate (glyceryl stearate), and glyceryl monobehenate (glyceryl behenate). Among these, in order to obtain a superior effect of reducing scorching (fading) of the polyol-crosslinked fluororubber, glyceryl monolaurate, glyceryl monomyristate, glyceryl monopalmitate, glyceryl monooleate, or glyceryl stearate is preferable.

The amount of monoglycerides added with respect to 100 parts by mass of the hydrin rubber is preferably 0.5 parts by mass or more and 5.0 parts by mass or less, and more preferably 1.0 part by mass or more and 3.0 parts by mass or less in order to obtain a superior effect of reducing scorching (fading) of the polyol-crosslinked fluororubber.

The hydrin-based rubber composition that forms the outer layer 14 may contain other components as necessary. Examples of other components include carbon black, acid acceptors, plasticizers, fillers, processing aids, colorants, stabilizers, adhesion aids, mold release agents, thermal conductivity imparting agents, thermal conductivity imparting agents, surface non-adhesives, flexibility imparting agents, heat resistance improvers, antioxidants, pigments, flame retardants, crosslinking accelerators, and crosslinking retardants.

Carbon black is used as a filler and the like. It is preferable for carbon black to have a relatively small specific surface area. This is because carbon black with a small specific surface area restricts adsorption of monoglycerides and makes it difficult to inhibit the effects of monoglycerides. The specific surface area of carbon black can be expressed by the amount of DBP absorbed. The amount of DBP absorbed by carbon black is calculated from an amount of DBP (dibutyl phthalate) that 100 g of carbon black absorbs according to JIS K6221. The amount of DBP absorbed by carbon black is preferably 120 $cm^3/100$ g or less and more preferably 90 $cm^3/100$ g or less in order to restrict adsorption of monoglycerides. In addition, the amount of DBP absorbed by carbon black is preferably 50 $cm^3/100$ g or more and more preferably 60 $cm^3/100$ g or more in order to obtain excellent handling properties.

The amount of carbon black added with respect to 100 parts by mass of the hydrin rubber is preferably 30 parts by mass or more and 100 parts by mass or less and more preferably 50 parts by mass or more and 90 parts by mass or less.

The acid acceptor can neutralize an acid generated by decomposition of monoglycerides. Examples of acid acceptors include hydrotalcite, magnesium oxide, magnesium hydroxide, aluminum oxide, aluminum hydroxide, calcium oxide, calcium hydroxide, calcium carbonate, calcium silicate, basic silicon dioxide, and zeolites. These acid acceptors may be used alone or two or more thereof may be used in combination. Among these, hydrotalcite is particularly preferable in order to obtain excellent scorch resistance.

The amount of the acid acceptor added with respect to 100 parts by mass of the hydrin rubber is preferably 1 part by mass or more and 20 parts by mass or less, more preferably 3 parts by mass or more and 15 parts by mass or less, and still more preferably 5 parts by mass or more and 10 parts by mass or less in order to increase the crosslinking efficiency.

As the plasticizer, an ester-based synthetic plasticizer and the like can be used. Examples of ester-based synthetic plasticizers include phthalic ester, adipic acid ester, and adipic acid polyester. Examples of phthalic esters include diisononyl phthalate (DINP) and di-n-butyl phthalate (DBP). Examples of adipic acid esters include dioctyl adipate (DOA), dibutyl glycol adipate, and dibutyl carbitol adipate.

The solubility parameter value of the plasticizer is preferably 8.0 or more and 10.0 or less and more preferably 9.0 or more and 10.0 or less. Since the solubility parameter value of the plasticizer is close to the solubility parameter value of the hydrin rubber, the monoglyceride is not inhibited by the plasticizer and is unevenly distributed at the interface with the inner layer 12 in the outer layer 14, and it is possible to inhibit scorching (fading) of the polyol-crosslinked fluororubber at the adhesive interface between the inner layer 12 and the outer layer 14. The solubility parameter (SP value) can be calculated from the molecular structure by the Small's calculation method.

The amount of the plasticizer added with respect to 100 parts by mass of the hydrin rubber is preferably 3 parts by mass or more and 20 parts by mass or less and more preferably 5 parts by mass or more and 10 parts by mass or less.

The fuel hose 10 can be produced as follows. First, a fluorine-based rubber composition for forming an inner layer and a hydrin-based rubber composition for forming an outer layer are prepared, the rubber composition for forming an inner layer is extruded and molded into a cylindrical shape, and the rubber composition for forming an outer layer is then directly extruded and molded without applying an adhesive to the surface (outer circumferential surface) to form a laminate in a raw rubber state. The laminate in a raw rubber state can be appropriately stored. Next, the fuel hose 10 can be produced by crosslinking respective layers. Here, respective layers may be formed by a coextrusion mold.

In the fuel hose 10 according to the disclosure, the inner layer 12 in a tubular shape is composed of a crosslinked body of a rubber composition containing the above (A) to (E), and the outer layer 14 provided in contact with the outer circumferential surface of the inner layer 12 is composed of a crosslinked body of a rubber composition containing the above (F) to (G). The monoglyceride added to the outer layer 14 containing a hydrin rubber is likely to be unevenly distributed at the interface of the inner layer 12 in the outer layer 14 containing a hydrin rubber and appears at the adhesive interface between the inner layer 12 and the outer layer 14. The monoglyceride reduces scorching (fading) of the polyol-crosslinked fluororubber due to calcium hydroxide at the adhesive interface between the inner layer 12 and the outer layer 14, and the adhesion between the inner layer 12 composed of a polyol-crosslinked fluororubber and the outer layer 14 composed of a hydrin rubber is excellent even when stored in a raw rubber state after extrusion.

While embodiments of the disclosure have been described above, the disclosure is not limited to the embodiments, and various modifications may be made without departing from the spirit and scope of the disclosure.

EXAMPLES

Hereinafter, the disclosure will be described in detail using examples and comparative examples.

Example 1

<Preparation of Rubber Composition for Forming Inner Layer>

With respect to 100 parts by mass of a polyol-crosslinked fluororubber (containing a polyol crosslinking agent), 6 parts by mass of calcium hydroxide (crosslinking accelerator), 1 part by mass of triallyl isocyanurate (co-crosslinking agent), 0.5 parts by mass of a peroxide crosslinking agent, 3 parts by mass of magnesium oxide (acid acceptor), and 13 parts by mass of carbon black <3> were added and kneaded using a kneader, and thereby a fluorine-based rubber composition for forming an inner layer was prepared.

<Preparation of Rubber Composition for Forming Outer Layer>

With respect to 100 parts by mass of the hydrin rubber, 1.5 parts by mass of monoglyceride <1>, 75 parts by mass of carbon black <1>, 6 parts by mass of hydrotalcite (acid acceptor), 1.5 parts by mass of magnesium oxide (acid acceptor), 7.5 parts by mass of a plasticizer <1>, 1 part by mass of an antioxidant, 1 part by mass of a DBU salt (crosslinking accelerator), and 5 parts by mass of a flame retardant were added and mixed using a Banbury mixer, and 3 parts by mass of a crosslinking agent and 1 part by mass of a crosslinking retardant were then added and kneaded using a roller, and thereby a hydrin-based rubber composition for forming an outer layer was prepared.

<Production of Fuel Hose>

The prepared rubber composition for forming an inner layer and rubber composition for forming an outer layer were used and subjected to coextrusion molding, and thereby a fuel hose (an inner diameter of 25 mm and an outer diameter of 33 mm) in which a hydrin-based rubber layer (a thickness of 3 mm) was laminated on the outer circumference of a fluorine rubber layer (a thickness of 1 mm) was produced.

Example 2-3

A fuel hose was produced in the same manner as in Example 1 except that the type of monoglycerides was changed in the preparation of the rubber composition for forming an outer layer.

Example 4

A fuel hose was produced in the same manner as in Example 1 except that the type of carbon black was changed in the preparation of the rubber composition for forming an outer layer.

Example 5

A fuel hose was produced in the same manner as in Example 1 except that the amount of hydrotalcite added was changed in the preparation of the rubber composition for forming an outer layer.

Example 6

A fuel hose was produced in the same manner as in Example 1 except that the type of the plasticizer was changed in the preparation of the rubber composition for forming an outer layer.

Example 7-8

A fuel hose was produced in the same manner as in Example 1 except that the amount of monoglycerides added was changed in the preparation of the rubber composition for forming an outer layer.

Comparative Example 1

A fuel hose was produced in the same manner as in Example 1 except that no monoglyceride was added in the preparation of the rubber composition for forming an outer layer.

Comparative Example 2-3

A fuel hose was produced in the same manner as in Example 1 except that the type of monoglycerides was changed in the preparation of the rubber composition for forming an outer layer.

Materials used are as follows.

(Fluorine-Based Rubber Composition)

polyol-crosslinked fluororubber (containing a polyol crosslinking agent): "DAI-EL G558" (commercially available from Daikin Industries, Ltd.)

calcium hydroxide: "CALDIC" (commercially available from Ohmi Chemical Industry Co., Ltd.)

triallyl isocyanurate: "TAIC M-60" (commercially available from Mitsui Chemicals Inc)

peroxide crosslinking agent: "Perhexa 25B-40" (commercially available from NOF Corporation)

magnesium oxide: "Kyowamag #150" (commercially available from Kyowa Chemical Industry Co., Ltd.)

carbon black <3>: "Seast GS" (commercially available from Tokai Carbon Co., Ltd.) (Hydrin-based rubber composition)

hydrin rubber: "EPICHLOMER CL" (commercially available from Osaka Soda Co., Ltd.)

monoglyceride <1> (glyceryl monooleate): "Rikemal XO-100," a linear and unsaturated aliphatic hydrocarbon group having 17 carbon atoms (commercially available from Riken Vitamin Co., Ltd.)

monoglyceride <2> (glyceryl monolaurate): "Poem M-300," a linear and saturated aliphatic hydrocarbon group having 11 carbon atoms (commercially available from Riken Vitamin Co., Ltd.)

monoglyceride <3> (glyceryl monobehenate): "Rikemal B-100," a linear and saturated aliphatic hydrocarbon group having 21 carbon atoms (commercially available from Riken Vitamin Co., Ltd.)

monoglyceride <4> (glyceryl monocaprylate): "Poem M-100," a linear and saturated aliphatic hydrocarbon group having 7 carbon atoms (commercially available from Riken Vitamin Co., Ltd.)

diglyceride (glyceryl dioleate): "Rikemal O-71-DE" (commercially available from Riken Vitamin Co., Ltd.)

carbon black <1>: "Seast S," a DBP absorption amount of 68 cm$^3$/100 g (commercially available from Tokai Carbon Co., Ltd.)

carbon black <2>: "Seast SO," a DBP absorption amount of 115 cm$^3$/100 g (commercially available from Tokai Carbon Co., Ltd.)

hydrotalcite: "DHT-4A" (commercially available from Kyowa Chemical Industry Co., Ltd.)

magnesium oxide: "Kyowamag #150" (commercially available from Kyowa Chemical Industry Co., Ltd.)

plasticizer <1> (ether ester-based): "ADK CIZER RS107," solubility parameter (SP)=9.2 (commercially available from ADEKA Corporation)

plasticizer <2> (polyester-based): "ADK CIZER RS966," solubility parameter (SP)=8.6 (commercially available from ADEKA Corporation)

crosslinking agent: "Daisonet XL-60C" (commercially available from Osaka Soda Co., Ltd.)

antioxidant: "Nocrac NBC" (commercially available from Ouchi Shinko Chemical Industrial Co., Ltd.)

crosslinking retardant: "Retarder CTP" (commercially available from Ouchi Shinko Chemical Industrial Co., Ltd.)

DBU salt (crosslinking accelerator): "DA-500" (commercially available from Osaka Soda Co., Ltd.)

flame retardant: "Fire Cut AT-3CN" (commercially available from Suzuhiro Chemical Co., Ltd.)

For the produced fuel hoses, the interlayer adhesion was evaluated. Table 1 shows the evaluation results together with formulations.

(Interlayer Adhesion)

The produced fuel hose (laminate) before crosslinking was subjected to a moist heat treatment (40° C.×95% RH×24H) and then heated at 160° C. for 45 minutes and subjected to steam crosslinking. A test piece with a width of 25 mm was cut out from the obtained fuel hose, the outer layer of the test piece was peeled off at a rate of 50 mm/min using a tensile testing machine, and the interlayer adhesive force at that time was measured. If the interlayer adhesive force was 2.4 N/mm or more, it was determined as very good "OO," if the interlayer adhesive force was 1.6 N/mm or more and less than 2.4 N/mm, it was determined as good "O," if the interlayer adhesive force was 1.0 N/mm or more and less than 1.6 N/mm, it was determined as slightly inferior "Δ," and if the interlayer adhesive force was less than 1.0 N/mm, it was determined as inferior "×."

TABLE 1

| | | Example | | | | | | | | Comparative Example | | |
|---|---|---|---|---|---|---|---|---|---|---|---|---|
| | | 1 | 2 | 3 | 4 | 5 | 6 | 7 | 8 | 1 | 2 | 3 |
| Inner layer | Polyol-crosslinked fluororubber (containing polyol crosslinking agent) | 100 | 100 | 100 | 100 | 100 | 100 | 100 | 100 | 100 | 100 | 100 |
| | Calcium hydroxide | 6 | 6 | 6 | 6 | 6 | 6 | 6 | 6 | 6 | 6 | 6 |
| | Triallyl isocyanurate | 1 | 1 | 1 | 1 | 1 | 1 | 1 | 1 | 1 | 1 | 1 |
| | Peroxide crosslinking agent | 0.5 | 0.5 | 0.5 | 0.5 | 0.5 | 0.5 | 0.5 | 0.5 | 0.5 | 0.5 | 0.5 |
| | Magnesium oxide | 3 | 3 | 3 | 3 | 3 | 3 | 3 | 3 | 3 | 3 | 3 |
| | Carbon black <3> | 13 | 13 | 13 | 13 | 13 | 13 | 13 | 13 | 13 | 13 | 13 |
| Outer layer | Hydrin rubber | 100 | 100 | 100 | 100 | 100 | 100 | 100 | 100 | 100 | 100 | 100 |
| | Monoglyceride <1> (C17) | 1.5 | — | — | 1.5 | 1.5 | 1.5 | 0.5 | 5 | — | — | — |
| | Monoglyceride <2> (C11) | — | 1.5 | — | — | — | — | — | — | — | — | — |
| | Monoglyceride <3> (C21) | — | — | 1.5 | — | — | — | — | — | — | — | — |
| | Monoglyceride <4> (C7) | — | — | — | — | — | — | — | — | — | 1.5 | — |
| | Diglyceride | — | — | — | — | — | — | — | — | — | — | 1.5 |
| | Carbon black <1> (68 cm$^3$/100 g) | 75 | 75 | 75 | — | 75 | 75 | 75 | 75 | 75 | 75 | 75 |
| | Carbon black <2> (115 cm$^3$/100 g) | — | — | — | 75 | — | — | — | — | — | — | — |
| | Hydrotalcite | 6 | 6 | 6 | 6 | 3 | 6 | 6 | 6 | 6 | 6 | 6 |
| | Magnesium oxide | 1.5 | 1.5 | 1.5 | 1.5 | 1.5 | 1.5 | 1.5 | 1.5 | 1.5 | 1.5 | 1.5 |
| | Plasticizer <1> (ether ester-based) | 7.5 | 7.5 | 7.5 | 7.5 | 7.5 | — | 7.5 | 7.5 | 7.5 | 7.5 | 7.5 |
| | Plasticizer <2> (polyester-based) | — | — | — | — | — | 7.5 | — | — | — | — | — |
| | Crosslinking agent | 3 | 3 | 3 | 3 | 3 | 3 | 3 | 3 | 3 | 3 | 3 |
| | Antioxidant | 1 | 1 | 1 | 1 | 1 | 1 | 1 | 1 | 1 | 1 | 1 |
| | Crosslinking retardant | 1 | 1 | 1 | 1 | 1 | 1 | 1 | 1 | 1 | 1 | 1 |
| | DBU salt | 1 | 1 | 1 | 1 | 1 | 1 | 1 | 1 | 1 | 1 | 1 |
| | Flame retardant | 5 | 5 | 5 | 5 | 5 | 5 | 5 | 5 | 5 | 5 | 5 |
| Evaluation | Interlayer adhesive force | ◎ | ○ | ○ | ○ | ○ | △ | △ | △ | ✕ | ✕ | ✕ |

In Comparative Examples 1 to 3, during storage after the inner layer and the outer layer were extruded and molded, the uncrosslinked fluororubber in the inner layer scorched and faded at the adhesive interface with the outer layer due to calcium hydroxide (basic component), and accordingly, the interlayer adhesion between the inner layer containing a polyol-crosslinked fluororubber and the outer layer containing a hydrin rubber was poor. On the other hand, in examples, during storage after the inner layer and the outer layer were extruded and molded, such fading was not observed, and the interlayer adhesion between the inner layer containing a polyol-crosslinked fluororubber and the outer layer containing a hydrin rubber was excellent.

Comparing examples with comparative examples, in the examples, a monoglyceride having an aliphatic hydrocarbon group having 10 or more and 22 or less carbon atoms was added to the outer layer containing a hydrin rubber, but in Comparative Example 1, no monoglyceride was added to the outer layer containing a hydrin rubber, in Comparative Example 2, monoglycerides were added to the outer layer containing a hydrin rubber, but the number of carbon atoms in the aliphatic hydrocarbon group was 9 or less, and in Comparative Example 3, diglycerides instead of monoglycerides were added to the outer layer containing a hydrin rubber. Accordingly, it can be said that, as in the examples, when a monoglyceride having an aliphatic hydrocarbon group having 10 or more and 22 or less carbon atoms was added to the outer layer containing a hydrin rubber, even when stored in a raw rubber state after the inner layer and the outer layer were extruded and molded, the adhesion between the inner layer composed of a polyol-crosslinked fluororubber and the outer layer composed of a hydrin rubber was excellent.

Next, comparing examples, it can be understood from Examples 1 to 3 that, when a monoglyceride having an aliphatic hydrocarbon group having 12 or more and 20 or less carbon atoms was used, the interlayer adhesion between the inner layer and the outer layer was particularly excellent. In addition, it can be understood from Examples 1 and 4 that, when carbon black, which was added to the outer layer containing monoglyceride, having a DBP absorption amount of 50 cm$^3$/100 g or more and 90 cm$^3$/100 g or less was used, the interlayer adhesion between the inner layer and the outer layer was particularly excellent. In addition, it can be understood from Examples 1 and that, when the amount of hydrotalcite (acid acceptor) added to the outer layer containing monoglyceride with respect to 100 parts by mass of the hydrin rubber was set to 5 parts by mass or more and 10 parts by mass or less, the interlayer adhesion between the inner layer and the outer layer was particularly excellent. In addition, it can be understood from Examples 1 and 6 that, when a plasticizer, which was added to the outer layer containing monoglyceride, having a solubility parameter (SP value) of 9.0 or more and 10.0 or less was used, the interlayer adhesion between the inner layer and the outer layer was particularly excellent. In addition, it can be understood from Examples 1 and 7-8 that, when the amount of monoglycerides added with respect to 100 parts by mass of the hydrin rubber was set to 1.0 part by mass or more and 3.0 parts by mass or less, the interlayer adhesion between the inner layer and the outer layer was particularly excellent.

While embodiments and examples of the disclosure have been described above, the disclosure is not limited to the embodiments and examples, and various modifications may be made without departing from the spirit and scope of the disclosure.

What is claimed is:

1. A fuel hose having an inner layer in a tubular shape and an outer layer provided in contact with an outer circumferential surface of the inner layer,
   wherein the inner layer is composed of a crosslinked body of a rubber composition containing the following (A) to (E), and
   wherein the outer layer is composed of a crosslinked body of a rubber composition containing the following (F) to (G):
   (A) polyol-crosslinked fluororubber
   (B) polyol crosslinking agent
   (C) calcium hydroxide
   (D) triallyl isocyanurate
   (E) peroxide crosslinking agent
   (F) hydrin rubber
   (G) monoglyceride having an aliphatic hydrocarbon group having 10 or more and 22 or less carbon atoms.

2. The fuel hose according to claim 1,
   wherein the content of (G) with respect to 100 parts by mass of (F) is 0.5 parts by mass or more and 5.0 parts by mass or less.

3. The fuel hose according to claim 1,
   wherein the outer layer further contains carbon black having a DBP absorption amount of 50 cm$^3$/100 g or more and 120 cm$^3$/100 g or less.

4. The fuel hose according to claim 1,
   wherein the outer layer further contains an acid acceptor.

5. The fuel hose according to claim 4,
   wherein the acid acceptor is a hydrotalcite.

6. The fuel hose according to claim 1,
   wherein the outer layer further contains a plasticizer.

7. The fuel hose according to claim 6,
   wherein the plasticizer has a solubility parameter value of 8.0 or more and 10.0 or less.

* * * * *